(12) United States Patent
Shen et al.

(10) Patent No.: US 11,926,308 B2
(45) Date of Patent: Mar. 12, 2024

(54) METHODS AND SYSTEM FOR OPERATING AN ENGINE

(71) Applicant: Ford Global Technologies, LLC, Dearborn, MI (US)

(72) Inventors: Stephen Shen, Canton, MI (US); William David Treharne, Ypsilanti, MI (US); Carol Louise Okubo, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 17/653,810

(22) Filed: Mar. 7, 2022

(65) Prior Publication Data

US 2023/0278538 A1 Sep. 7, 2023

(51) Int. Cl.
| | |
|---|---|
| *B60W 10/06* | (2006.01) |
| *B60W 10/08* | (2006.01) |
| *B60W 20/40* | (2016.01) |
| *B60W 40/06* | (2012.01) |
| *F02D 41/02* | (2006.01) |
| *F02D 41/04* | (2006.01) |
| *F02P 5/15* | (2006.01) |

(52) U.S. Cl.
CPC ............ *B60W 10/06* (2013.01); *B60W 10/08* (2013.01); *B60W 20/40* (2013.01); *B60W 40/06* (2013.01); *F02D 41/0225* (2013.01); *F02D 41/042* (2013.01); *F02P 5/1504* (2013.01); *F02P 5/1508* (2013.01); *B60W 2510/1005* (2013.01); *B60W 2510/101* (2013.01); *B60W 2510/18* (2013.01); *B60W 2510/244* (2013.01); *B60W 2520/00* (2013.01); *B60W 2520/04* (2013.01); *B60W 2520/30* (2013.01); *B60W 2552/15* (2020.02); *F02D 2200/501* (2013.01); *F02D 2200/502* (2013.01)

(58) Field of Classification Search
CPC ...... B60W 10/06; B60W 10/08; B60W 20/40; B60W 2510/101; B60W 2510/18; B60W 2510/244; B60W 2520/04; B60W 2520/30; B60W 2552/00; B60W 2552/15; F02D 41/0225; F02D 41/042; F02D 2200/501; F02D 2200/502; F02P 5/1504; F02P 5/1508
See application file for complete search history.

(56) References Cited

U.S. PATENT DOCUMENTS

| | | | |
|---|---|---|---|
| 8,271,173 B2 * | 9/2012 | Wilmanowicz | B60W 20/00 477/3 |
| 9,205,827 B2 | 12/2015 | Yamaguchi et al. | |
| 9,475,479 B2 | 10/2016 | Hancasky et al. | |
| 10,933,752 B2 | 3/2021 | Miller et al. | |
| 2012/0303194 A1 | 11/2012 | Muta | |

* cited by examiner

*Primary Examiner* — Hung Q Nguyen
*Assistant Examiner* — Mark L. Greene
(74) *Attorney, Agent, or Firm* — David Kelley; McCoy Russell LLP

(57) ABSTRACT

Systems and methods for operating an internal combustion engine that is coupled to a power split transmission are described. In one example, the internal combustion engine is operated in a speed control mode or a torque control mode in response to a braking torque and a transmission shift command. Operating the engine in the torque control mode may allow the engine to charge a battery while a neutral transmission state is selected.

18 Claims, 5 Drawing Sheets

METHODS AND SYSTEM FOR OPERATING AN ENGINE

FIELD

The present description relates to methods and a system for operating an engine of a hybrid vehicle.

BACKGROUND AND SUMMARY

A hybrid vehicle may include a power split transmission. The power split transmission may be comprised of gears including a planetary gear set. The power split transmission may also be configured such that power sources (e.g., internal combustion engines and electric machines) coupled to the power split transmission are continuously coupled to gears within the power split transmission. As such, the power split transmission may or may not include clutches. While the power split transmission may not include clutches and stepped gear ratios, it may be operated in accordance with a shifter that has a neutral position. In a particular, when the shifter is placed in a neutral position, the engine may be operated in a speed control mode so that the possibility of unintended vehicle motion through the application of engine torque to the wheels may be reduced. However, the engine may not be intentionally stopped or started in present systems when the shifter is in the neutral position so that the possibility of unintended vehicle motion may be reduced. Additionally, the engine may not be used to charge the vehicle's battery while the shifter is in the neutral position so that the possibility of unintended vehicle motion may be reduced.

Some drivers that are used to manual shift transmissions may move the shifter to the neutral position each time their vehicle comes to a stop out of habit or in an effort to reduce engine load so as to reduce fuel consumption. If vehicle electrical loads reduce battery charge to less than a threshold level while the shifter is in the neutral position, features such as the electric climate control system may stop operating, and eventually the battery's contactors open and the vehicle shuts down. Vehicle operators may find this situation frustrating and may prefer an alternative way of operating a vehicle having a power split transmission while a shifter is in a neutral position.

The inventors herein have recognized the above-mentioned issues and have developed a method for operating an engine, comprising: via a controller, adjusting engine torque as a function of a delivered or an actual braking torque in response to a transmission shifter being engaged in a neutral position.

By operating the engine in a torque control mode where engine torque is adjusted based on a requested braking torque, it may be possible to provide torque to charge a battery and prevent unintentional vehicle motion when a split ratio transmission is commanded to a neutral operating state. In addition, the engine output torque may be further adjusted based on a torque that is sufficient to hold a vehicle stationary when powertrain torque delivered to the vehicle's wheels is zero. As a result, a vehicle battery may be charged while a shifter is in a neutral state and while the vehicle is stationary so that battery charge may not be depleted.

The present description may provide several advantages. In particular, the approach may improve operation of a vehicle that includes a power split transmission. Further, the approach may reduce a possibility of unintended vehicle movement. In addition, the approach may permit the vehicle's battery to be charged while a power split transmission is commanded to a neutral state.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 4:
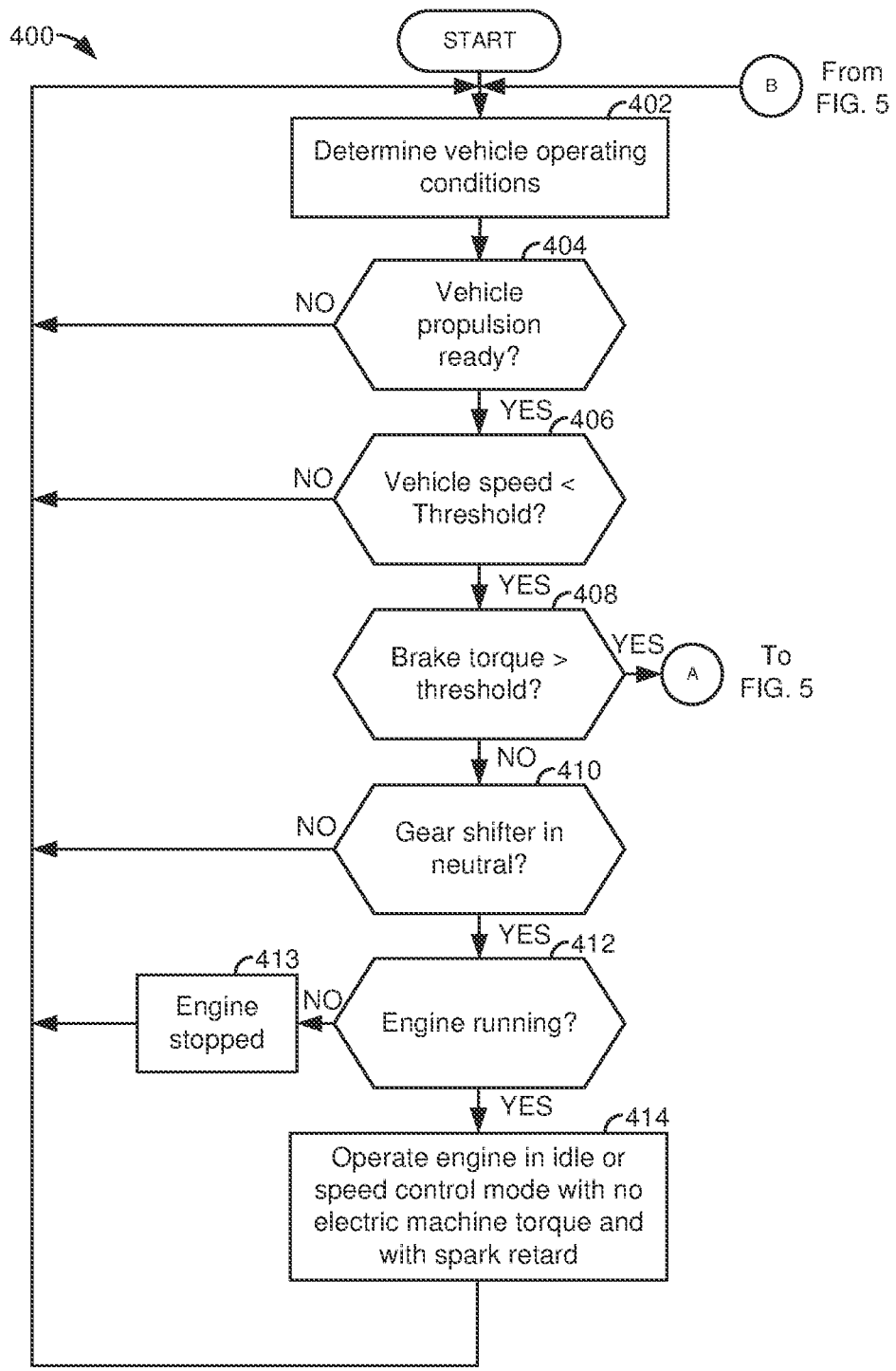
FIGS. 4 and 5 show an example method for operating a vehicle.
Figure 5:
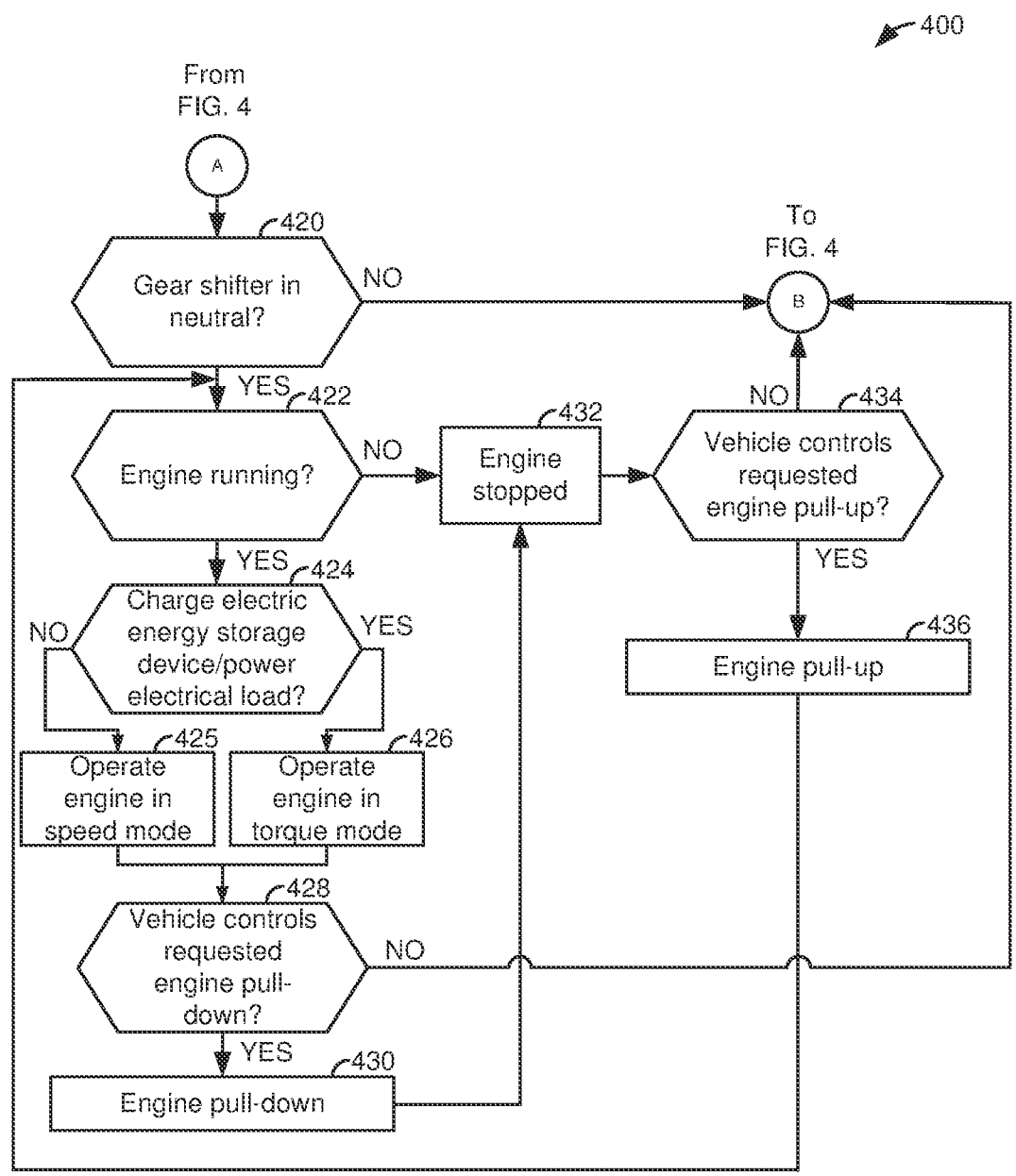

The present description is related to operating a vehicle that includes a power split transmission. The vehicle may include an engine of the type shown in FIG. 1. The engine may be included in a driveline of a hybrid vehicle as shown in FIG. 2. The vehicle may be operated according to the sequence shown in FIG. 3. A flowchart of a method for operating a vehicle that includes an engine and a power split transmission is shown in FIGS. 4 and 5.

Figure 1:
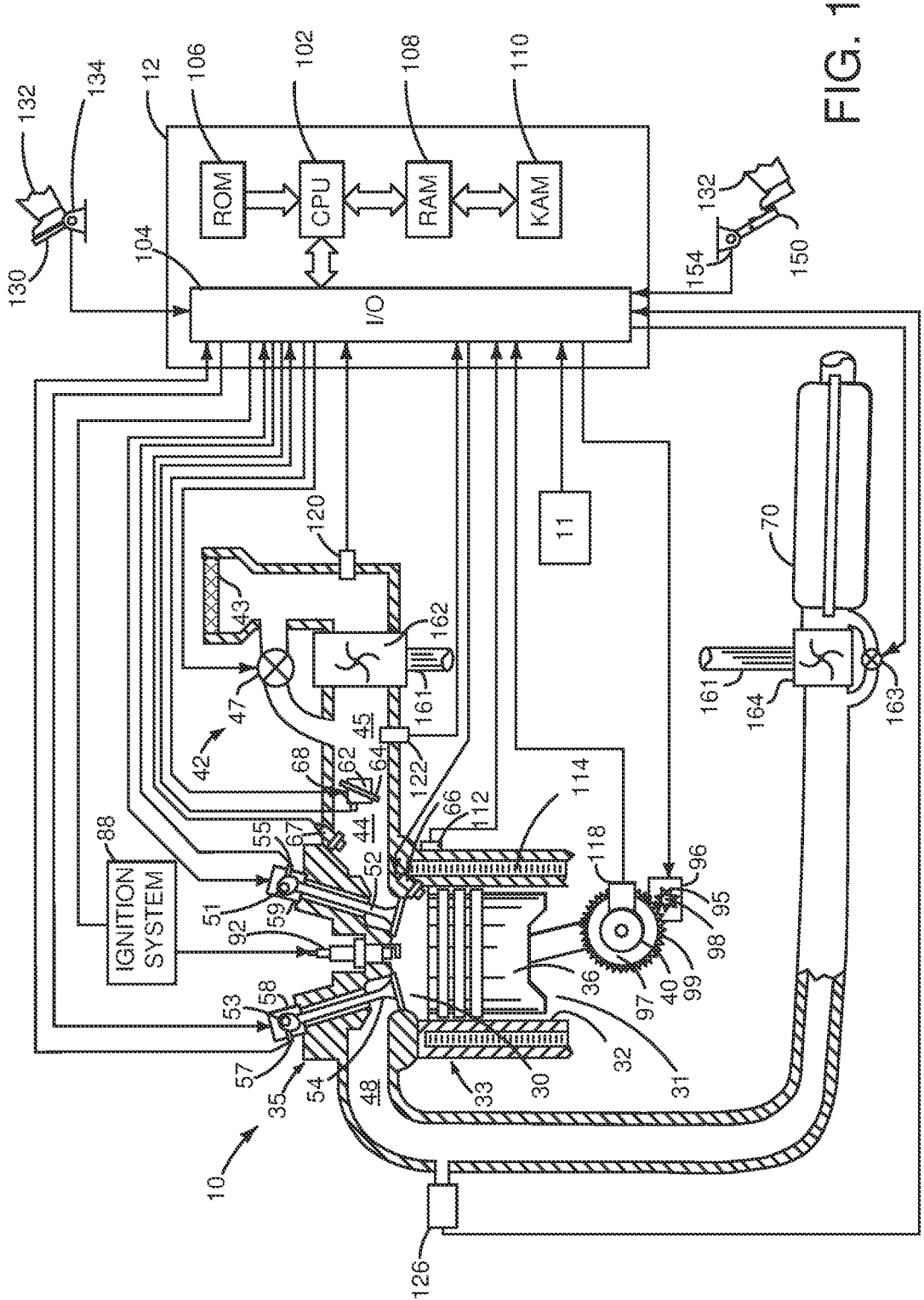
FIG. 1 is a schematic diagram of an engine.
Figure 2:
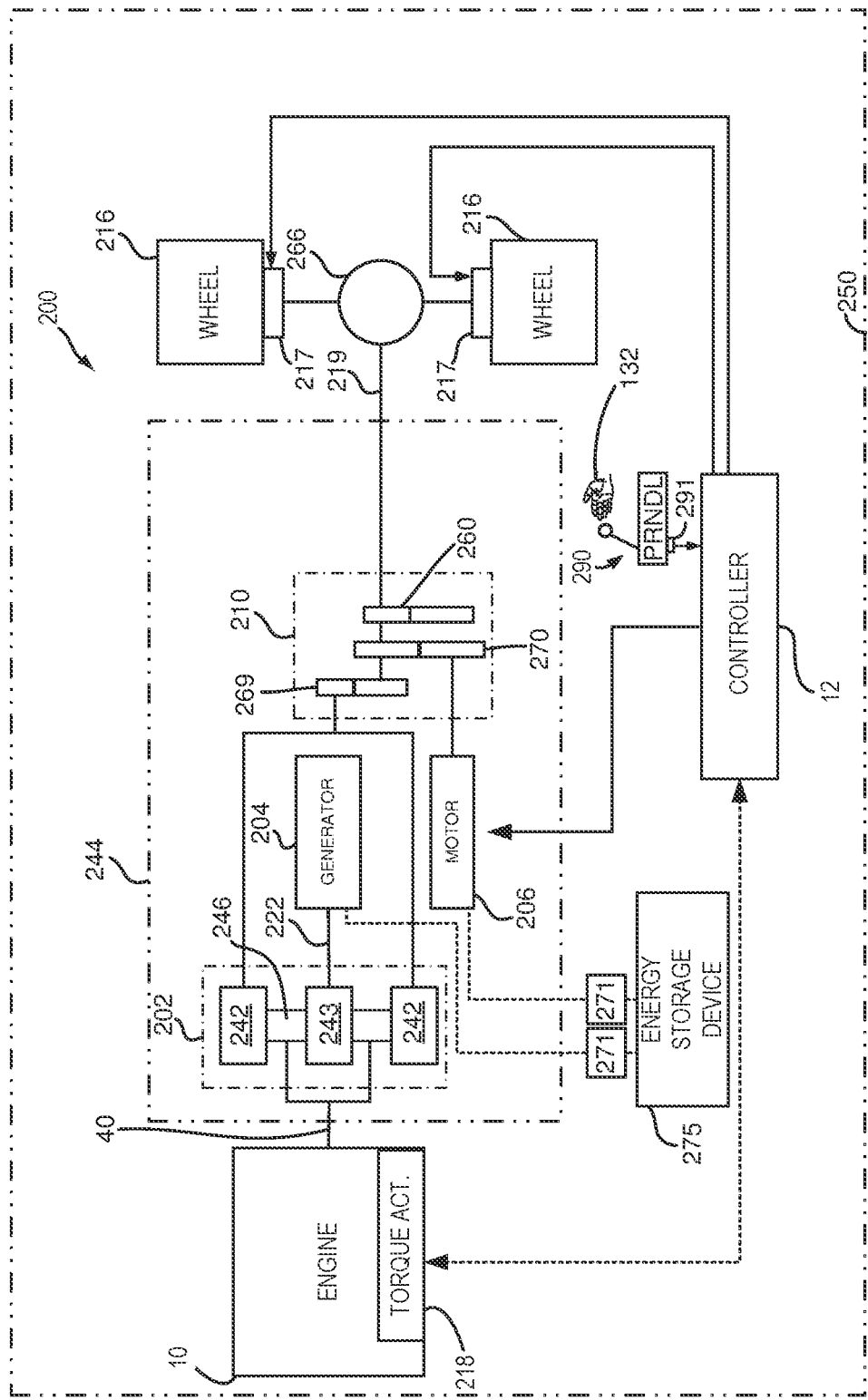
FIG. 2 is a schematic diagram of a hybrid vehicle driveline.

Referring to FIG. 1, internal combustion engine 10 (also referred to as "engine"), comprising a plurality of cylinders, one cylinder of which is shown in FIG. 1, is controlled by electronic engine controller 12. The controller 12 receives signals from the various inputs (e.g., sensors) shown in FIGS. 1 and 2. The controller 12 also employs the actuators shown in FIGS. 1 and 2 to adjust engine and driveline operation based on the received signals and instructions stored in memory of controller 12.

Engine 10 is comprised of cylinder head 35 and block 33, which includes combustion chamber 30 and cylinder walls 32 in cylinder 31. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into combustion chamber 30, which is known to those skilled in the art as direct injection. Port fuel injector 67 is shown positioned to inject fuel into the intake port of combustion chamber 30, which is known to those skilled in the art as port injection. Direct fuel injector 66 and port fuel injector 67 deliver liquid fuel in proportion to pulse widths provided by controller 12. Fuel is delivered to fuel direct fuel injector 66 and port fuel injector 67 by a fuel system (not shown) including a fuel tank, fuel pump, and fuel rail (not shown).

In addition, intake manifold 44 is shown communicating with turbocharger compressor 162 and engine air intake 42. In other examples, turbocharger compressor 162 may be a supercharger compressor. Shaft 161 mechanically couples turbocharger turbine 164 to turbocharger compressor 162. Optional electronic throttle 62 (also referred to as "throttle") adjusts a position of throttle plate 64 to control air flow from turbocharger compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of turbocharger compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalyst 70. Alternatively, a two-state exhaust gas oxygen sensor may be substituted for UEGO sensor 126.

Exhaust gases may be processed via catalyst 70. Catalyst 70 can include multiple bricks, and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human vehicle driver 132; a position sensor 154 coupled to brake pedal 150 (e.g., a human/machine interface) for sensing force applied by human vehicle driver 132, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, an example of a driveline 200 is shown. Driveline 200 includes engine 10 and torque actuator 218. Torque actuator 218 may be a throttle, fuel injector, camshaft actuator, ignition system, or other actuator that may adjust engine torque. Engine 10 delivers power to transmission 244 via crankshaft 40. In the depicted example, transmission 244 is a power-split transmission (or transaxle) that includes a planetary gear set 202 that includes one or more rotating gear elements. Transmission 244 further includes an electric generator 204 and an electric motor 206. The electric generator 204 and the electric motor 206 may also be referred to as electric machines as each may operate as either a motor or a generator. Torque may be output from transmission 244 to propel vehicle 250 using traction wheels 216 via a power transfer gearing 210, a torque output shaft 219, and a differential-and-axle assembly 266. A braking torque may be provided via friction or foundation brakes 217.

Electric generator 204 and electric motor 206 are electrically coupled to electric energy storage device 275 such that each of electric generator 204 and electric motor 206 may be operated using electric energy from an electric energy storage device 275 (e.g., a high voltage battery). In some examples, an energy conversion device, such as an inverter 271, may be coupled between the battery and the motor to convert the DC output of the battery into an AC output for use by electric motor 206. Due to the mechanical properties of the planetary gear set 202, electric generator 204 may be driven by a power output element (on an output side) of the planetary gear set 202 via mechanical connection 222.

Electric motor 206 may be operated in a regenerative mode, that is, as a generator, to absorb kinetic energy from the vehicle and/or the engine and convert the absorbed kinetic energy to an energy form suitable for storage in electric energy storage device 275. In addition, electric motor 206 may be operated as a motor or generator, as required, to augment or absorb torque provided by the engine, such as during a transition of engine 10 between different operating modes.

Planetary gear set 202 comprises a ring gear 242, a sun gear 243, and a planetary gear carrier 246. The ring gear and sun gear may be coupled to each other via the planetary gear carrier 246. Crankshaft 40 of engine 10 is mechanically coupled to carrier 246 and sun gear 243 is mechanically coupled to generator 204. Ring gear 242 is mechanically coupled to power transfer gearing 210 including one or more meshing gear elements 260. Electric motor 206 drives gear element 270 and electric generator 204 is coupled to sun gear 243. In this way, the planetary gear carrier 246 (and consequently the engine and generator) may be coupled to the vehicle's wheels and the electric motor 206 via one or more gear elements.

Hybrid propulsion system or driveline 200 may be operated in various modes including a full hybrid mode, wherein the vehicle is driven by only engine 10 and electric generator 204 cooperatively, or only the electric motor 206, or a combination of the same. Alternatively, assist or mild hybrid examples may also be employed, wherein the engine 10 is the primary source of power and the electric motor 206 selectively adds torque during specific conditions, such as during a driver demand tip-in event (e.g., application of the driver demand pedal).

The vehicle may be driven in a first engine-on mode, which may be referred to as an "engine" mode, wherein engine 10 is operated in conjunction with the electric generator 204 (which provides reaction torque to the planetary gear-set and allows a net planetary output torque for propulsion of the vehicle) and used as the primary source of power and torque for powering traction wheels 216. In this mode, electric generator 204 may generate electric power, and the electric power generated may be applied by the drive motor 206 to propel the vehicle as well. This may result in no net power being delivered to the high voltage battery 275 or the high voltage accessories from the engine power. If the drive motor 206 did not use the generator power, that generator power would have to be used by the high voltage accessories or to charge the high voltage battery. All power generated by the engine is consumed in a power split system. During the "engine" mode, fuel may be supplied to engine 10 from a fuel tank via direct fuel injector 66 so that the engine can spin fueled to provide the torque for propelling the vehicle. Specifically, engine power is delivered to the ring gear 242 of the planetary gear set 202, thereby delivering power to traction wheels 216. Optionally, the engine may be operated to output more torque than is needed for propulsion, in which case the additional power may be absorbed by electric generator 204 (in a generating mode) to charge electric energy storage device 275 or supply electrical power for other vehicle electrical loads.

In another example, the hybrid propulsion system may be driven in a second engine-on mode, which may be referred to as an "assist" mode. During assist mode, engine 10 is operated and used as the primary source of torque for powering traction wheels 216 and electric motor 206 is used as an additional torque source to act in cooperation with, and supplement the torque provided by engine 10. During the "assist" mode, as in the engine-only mode, fuel is supplied to engine 10 so as to spin the engine fueled and provide torque to the vehicle wheels.

In still another example, the hybrid propulsion system or driveline 200 may be driven in an engine-off mode, which may be referred to as an electric-only mode, wherein battery powered electric motor 206 is operated and used as the only source of power for driving traction wheels 216. As such, during the engine-off mode, no fuel may be injected to engine 10 irrespective of whether the engine is spinning or not. The "engine-off" mode may be employed, for example, during braking, while no loads request engine power, or when propulsion is not needed, such as while the vehicle is stopped at traffic signals, etc. Specifically, motor power is delivered to gear element 270, which in turn drives the meshing gear elements 260, thereby driving traction wheels 216. The generator 204 spins so that all of the rotation of ring gear 242 is balanced and planetary gear carrier 246 has a net zero speed, thereby allowing the engine to not spin.

During the engine-off mode, based on vehicle speed and driver demand torque, the vehicle may be operated in a first electric-only mode, wherein the vehicle is propelled by the electric energy storage device 275 via the electric motor 206 with the engine not spinning and not fueled, or in a second electric-only mode wherein the vehicle is propelled by the electric energy storage device 275 via electric motor 206 with the engine spinning unfueled. During the second electric-only mode, the electric generator 204 applies torque to planetary gear set 202 through sun gear 243. The planetary gear carrier 246 provides reaction torque to this generator torque, and consequently directs torque to the engine 10 to spin the engine 10. In this example, the reaction torque provided by planetary gear carrier 246 is supplied to motor 206 (or alternatively vehicle momentum when vehicle speed is decreasing), and consequently reduces torque from the motor to the wheels.

Shifter 290 may receive input from human vehicle driver 132 to select an operating mode for transmission 244. Shifter 290 may be placed into one of a plurality of positions or states as indicated by PRNDL. A driver may request that transmission 244 be in park when shifter 290 is moved to the "P" position. The driver may request that the transmission 244 be in reverse when shifter 290 is in the "R" position. The driver may request that the transmission 244 be in neutral when shifter 290 is in the "N" position. The driver may request that the transmission 244 be in drive when shifter 290 is in the "D" position. The driver may request that the transmission 244 be in low when shifter 290 is in the "L" position. Note that a low selection in the power split system is not a gear selection. Rather, it simulates engine braking when the drive demand pedal is fully released by generating more regenerative braking torque and/or spinning the engine unfueled to generate a torque on the wheels to reduce vehicle speed. The position of shifter 290 may be determined via shifter position sensor 291.

Thus, the system of FIGS. 1 and 2 provides for a system, comprising: an internal combustion engine; a power split transmission coupled to the engine; a shift selector; and a controller including executable instructions stored in non-transitory memory that cause the controller to operate the internal combustion engine in a torque control mode in response to vehicle speed being below a threshold speed, applied brake torque being greater than a threshold torque, and the shift selector being engaged in a neutral position. In a first example, the system further comprises additional instructions that cause the controller to operate the internal combustion engine in a speed control mode in response to the vehicle speed being below the threshold, the applied brake torque being less than the threshold torque, and the shift selector being engaged in the neutral position. In a second example that may include the first example, the system further comprises a first electric machine (e.g., 206) configured to deliver power to the power split transmission, and additional instructions to operate a second electric machine (e.g., 204) to generate zero wheel torque while operating the internal combustion engine in the speed control mode. In a third example that may include one or more of the first and second examples, the system further comprises additional instructions to adjust torque of the internal combustion engine while operating in the torque control mode as a function of brake torque. In a fourth example that may include one or more of the first through third examples, the system further comprises additional instructions to adjust torque of the internal combustion engine while operating in the torque control mode as a function of road grade. In a fifth example that may include one or more of the first through fourth examples, the system further comprises additional instructions to adjust torque of the internal combustion engine while operating in the torque control mode as a function of a battery state of charge and a battery charging limit. In a sixth example that may include one or more of the first through fifth examples, the system further comprises additional instructions to shut down the internal combustion engine while the internal combustion engine is operated in the torque control mode or in the speed control mode. In a seventh example that may include one or more of the first through sixth examples, the system further comprising additional instructions to apply spark retard as a function of a catalyst temperature during the torque control mode.

Figure 3:
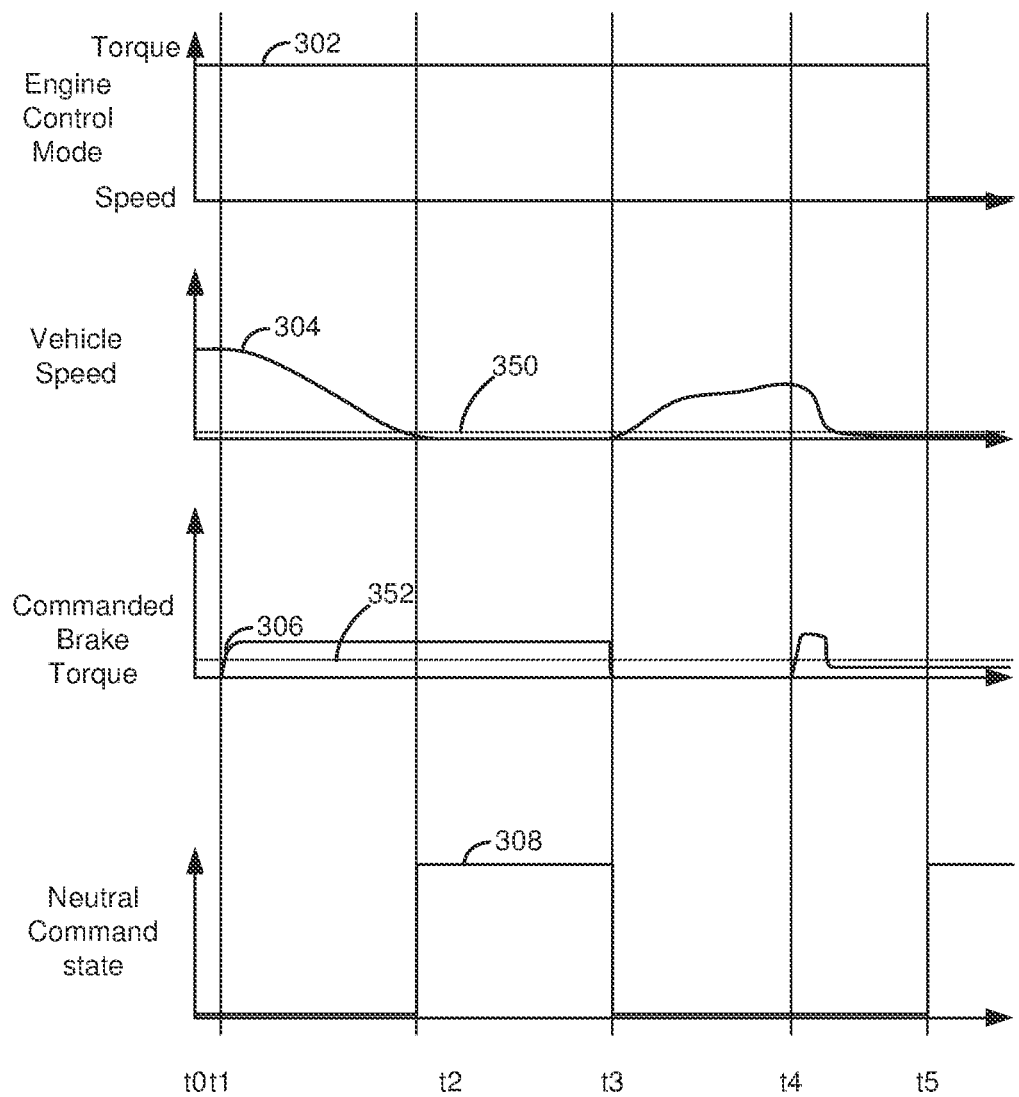
FIG. 3 shows a plot of an example vehicle operating sequence according to the method of FIGS. 4 and 5.

Referring now to FIG. 3, example plots of an engine operating sequence are shown. The operating sequence may be performed via the system of FIGS. 1 and 2 in cooperation with the method of FIGS. 4 and 5. Vertical lines at times t0-t5 represent times of interest during the sequence. The plots in FIG. 3 are time aligned and occur at the same time.

The first plot from the top of FIG. 3 is a plot of engine control mode versus time. The vertical axis represents the engine control mode and the engine control mode may be a torque control mode or a speed control mode. In torque control mode, the engine torque is adjusted to follow a torque request value that may be constant or changing in time. Engine speed may increase or decrease as engine torque follows the torque request. In speed control mode, engine torque is adjusted so that engine speed follows a requested speed. Trace 302 shows when the engine is in torque control mode and speed control mode. The engine is in torque control mode when trace 302 is at a higher level near the vertical axis arrow. The engine is in speed control mode when trace 302 is at a lower level near the horizontal axis. The horizontal axis represents time and time increases from the left side of the figure to the right side of the figure.

The second plot from the top of FIG. 3 is a plot of vehicle speed versus time. The vertical axis represents vehicle speed and vehicle speed increases in the direction of the vertical axis arrow. The horizontal axis represents time and time increases from the left side of the figure to the right side of the figure. Trace 304 represents vehicle speed. Horizontal line 350 represents a low vehicle speed threshold.

The third plot from the top of FIG. 3 is a plot of commanded brake torque. The vertical axis represents the commanded vehicle brake torque and vehicle brake torque increases in the direction of the vertical axis arrow. The horizontal axis represents time and time increases from the left side of the figure to the right side of the figure. Trace 306 represents the command brake torque. Horizontal line 352 represents a minimum brake torque to hold a vehicle stationary.

The fourth plot from the top of FIG. 3 is a plot of a transmission neutral command state versus time. The vertical axis represents the transmission command state and the transmission is commanded to neutral when trace 308 is at a higher level that is near the vertical axis arrow. The transmission is not commanded to neutral when trace 308 is at a lower level near the horizontal axis. The horizontal axis represents time and time increases from the left side of the figure to the right side of the figure. Trace 308 represents the commanded transmission state.

At time t0, the engine is operating in torque control mode and vehicle speed is at a middle level. The commanded brake torque is zero and the transmission is not commanded to a neutral state. Such conditions may be present when the vehicle is cruising.

At time t1, the engine remains in torque control mode, but the driver (not shown) applies the brake pedal so the commanded brake torque increases. The vehicle speed begins declining and the transmission is not commanded to a neutral state. Such conditions may be present when a vehicle approaches a traffic light.

At time t2, the engine remains in torque control mode and vehicle speed is below low speed threshold 350. The commanded brake torque is above a minimum brake torque to hold the vehicle stationary 352 and the driver (not shown) moves the shifter (not shown) to command the transmission and driveline to a neutral state. Because the commanded brake torque exceeds threshold 352 while vehicle speed is less than threshold 350 when the transmission is commanded to neutral, the engine may operate in torque control mode so that it may produce torque to charge a vehicle battery (not shown). In addition, since the commanded brake torque exceeds threshold 352, vehicle movement may be prevented.

Between time t2 and time t3, the engine remains in torque control mode so that the vehicle's battery (not shown) may be charged by torque generated by the engine and converted to electric charge via an electric machine (not shown). The vehicle also remains stopped and the transmission is commanded to neutral.

At time t3, the transmission is commanded out of neutral and it is commanded into drive (not shown) while the engine remains in torque control mode. The commanded brake torque is reduced to zero via the driver releasing the vehicle brake pedal (not shown), which allows the vehicle speed to begin increasing.

At time t4, the brake pedal is applied (not shown) to increase the commanded brake torque while the engine is in torque control mode. The vehicle speed begins to decrease and the transmission is not commanded to a neutral state.

Between time t4 and time t5, the vehicle speed is reduced to a low non-zero value while the engine remains in torque control mode. The commanded brake torque is less than a minimum brake torque to hold the vehicle 452 and the transmission is not commanded to neutral.

At time t5, the transmission is commanded to neutral. Since the commanded brake torque is less than the minimum brake torque to hold the vehicle 452, the engine mode is switched from torque control mode to speed control mode. Operating the engine in speed control mode allows the engine to maintain an idle speed while the requested braking torque may be insufficient to hold the vehicle stationary.

In this way, the operation of an internal combustion engine may be adjusted according to the commanded state of the transmission. In particular, the engine may be operated in a torque control mode to supply torque for charging a battery when commanded braking torque is sufficient to hold a vehicle stationary and a transmission is commanded to a neutral state. On the other hand, the engine may be operated in a speed control mode to maintain an engine idle speed when there may be insufficient commanded braking torque to hold the vehicle stationary and the transmission is commanded to the neutral state.

Referring now to FIGS. 4 and 5, a flow chart of a method for operating an engine with a particulate filter is shown. The method of FIGS. 4 and 5 may be incorporated into and may cooperate with the system of FIGS. 1 and 2. Further, at least portions of the method of FIGS. 4 and 5 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to vehicle status (e.g., activated/deactivated), engine operating state, battery system operating state, electric machine operating state, brake system operating state, transmission gear shifter position, and vehicle operating mode. Method 400 may determine the vehicle operating conditions via the sensors described herein. Method 400 proceeds to 404.

At 404, method 400 judges whether or not the vehicle propulsion system is ready to operate and propel the vehicle in a driving mode. Method 400 may judge whether or not the propulsion system is ready to operate based on operating conditions determined at 402. For example, if the vehicle operator has not placed the vehicle into a driving mode by starting the vehicle, method 400 may determine that the electric machine is not ready to operate. Similarly, if a pressure of fuel supplied to the engine is not greater than a threshold pressure, method 400 may judge that the engine is not ready to operate. If method 400 judges that the vehicle propulsion system is ready to operate, the answer is yes and method 400 proceeds to 406. Otherwise, the answer is no and method 400 returns to 402. Alternatively, method 400 may exit if the vehicle propulsion system is not ready to operate.

At 406, method 400 judges if vehicle speed is less than a threshold vehicle speed (e.g., 15 kilometers/hour). If so, the answer is yes and method 400 proceeds to 408. Otherwise, the answer is no and method 400 returns to 402, or alternatively, exits.

At 408, method 400 judges whether or not an actual brake torque is greater than a determined or calculated minimum brake torque to hold a vehicle (e.g., the vehicle that includes the engine, electric machines, and power split transmission) stationary threshold. The minimum brake torque to hold a vehicle stationary threshold is a brake torque threshold that may vary based on road grade and other vehicle operating conditions (e.g., vehicle mass, tire pressure, etc.). The actual brake torque may be provided via vehicle friction brakes. If method 400 judges that the actual brake torque is greater than the minimum brake torque to hold the vehicle threshold, the answer is yes and method 400 proceeds to 420. Otherwise, the answer is no and method 400 proceeds to 410.

At 410, method 400 judges whether or not the transmission gear shifter is in a neutral position, or alternatively, of the transmission or driveline has been commanded to a neutral state. The transmission or driveline may be commanded to a neutral state based on a position of the transmission gear shifter. If method 400 judges that the transmission gear shifter is in neutral or if the transmission or driveline has been commanded to neutral, the answer is yes and method 400 proceeds to 412. Otherwise, method 400 returns to 402, or alternatively exits.

At 412, method 400 judges if the engine is running. If the engine is not running (e.g., not rotating and not combusting fuel) or if the engine is being shut down, the answer is no and method 400 proceeds to 413. If method 400 judges that the engine is running, the answer is yes and method 400 proceeds to 414.

At 413, method 400 completes the engine shut down such that the engine stops rotating if the engine has been commanded to stop. Method 400 returns to 402, or alternatively, method 400 exits.

At 414, method 400 operates the engine at idle speed or in a speed control mode at a requested engine speed. Air flow, spark timing, and fuel flow to the engine may be adjusted to control the engine to the idle speed or requested speed. Additionally, spark timing may be adjusted as a function of catalyst temperature to heat or maintain catalyst temperature, thereby controlling engine emissions. The electric machines (e.g., 204 and 206) are not requested to provide positive or negative torque during these conditions. However, the electric machines may be controlled to generate zero wheel torque. Method 400 returns to 402, or alternatively, method 400 exits.

At 420, method 400 judges whether or not the transmission gear shifter is in a neutral position, or alternatively, of the transmission or driveline has been commanded to a neutral state. The transmission or driveline may be commanded to a neutral state based on a position of the transmission gear shifter. If method 400 judges that the transmission gear shifter is in neutral or if the transmission or driveline has been commanded to neutral, the answer is yes and method 400 proceeds to 422. Otherwise, method 400 returns to 402, or alternatively exits.

At 422, method 400 judges if the engine is running. If the engine is not running (e.g., not rotating and not combusting fuel) or if the engine is being shut down, the answer is no and method 400 proceeds to 432. If method 400 judges that the engine is running, the answer is yes and method 400 proceeds to 424.

At 424, method 400 judges if the engine is to supply torque for charging the electric energy storage device or to power an electrical load. In one example, method 400 may supply charge the electric energy storage device when a state of charge of the electric energy storage device is less than a threshold amount of charge. If method 400 judges to charge the electric energy storage device or to supply power to an electrical load, the answer is yes and method 400 proceeds to 426. Otherwise, the answer is no and method 400 proceeds to 425.

At 425, method 400 operates the engine in a speed control mode. The engine may be commanded to a predetermined idle speed (e.g., 800 RPM) and engine torque is adjusted so that engine speed is equal to the predetermined idle speed. Method 400 proceeds to 428.

At 426, method 400 operates the engine in a torque control mode. By operating the engine in torque control mode, engine torque may be adjusted to provide torque from which electric charge may be produced via electric generator 204. The electric charge may be stored in an electric energy storage device.

In one example, method 400 may adjust engine torque according to the following equation while operating in the torque control mode:

$$T_{eng}=f((T_{Brake}-V_{holdT}),C_{Limit},DC_{Limit})$$

where $T_{eng}$ is the requested engine torque, f is a function that returns the requested engine torque, values of function f may be empirically determined and/or modeled, $T_{Brake}$ is the actual brake torque (e.g., an amount of braking torque that is applied to vehicle wheels, the actual brake torque may be determined from the brake system as a function of hydraulic brake line pressure or other means), $V_{holdT}$ is a minimum brake torque that is sufficient to hold the vehicle stationary when zero powertrain torque is delivered to the vehicle's wheels under the present vehicle conditions such as road grade and vehicle weight, $C_{Limit}$ is the electric energy storage device charging limit, and $DC_{Limit}$ is a desired or requested charging limit. The charging limit (e.g., a threshold amount of charge supplied to an electric energy storage device that is not to be exceeded, where the threshold amount of charge may be an operating parameter of the electric energy storage device) and the desired charging limit (e.g., a threshold amount of charge supplied to the electric energy storage device that is not to be exceeded, where the threshold amount of charge may be a function of devices that are coupled to the electric energy storage device) may be threshold values that are not to be exceeded. Method 400 proceeds to 428.

At 428, method 400 judges whether or not vehicle controls (e.g., controller 12 or other controllers in the vehicle) have requested an engine pull-down (e.g., automated engine stop request that may be generated without input by a human to directly request stopping an engine). A vehicle controls engine stop may be requested in response to various vehicle operating conditions. For example, a vehicle controls engine stop may be requested when driver demand torque is not needed (e.g., driver demand torque is less than a threshold torque amount), high electric load is no longer needed, and electric energy storage device state of charge is greater than a threshold charge amount. Of course, vehicle controls engine stop requests may be generated in response to other vehicle operating conditions. If method 400 judges that vehicle controls have requested an engine pull-down, the answer is yes and method 400 proceeds to 430. Otherwise, the answer is no and method 400 returns to 402, or alternatively exits.

At 430, method 400 performs an engine pull-down or shut down. The engine may be shut down via ceasing fuel flow to the engine. In addition, spark delivery to engine cylinders may cease. Method 400 proceeds to 432.

At 432, method 400 completes the engine shut down such that the engine stops rotating if the engine has been commanded to stop. Method 400 proceeds to 434.

At 434, method 400 judges whether or not vehicle controls (e.g., controller 12 or other controllers in the vehicle) have requested an engine pull-up (e.g., automated cranking of the engine via an electric machine and starting the engine that may be generated without input by a human to directly request starting the engine). A vehicle controls engine start may be requested in response to various vehicle operating conditions. For example, a vehicle controls engine start may be requested in response to an increasing driver demand, low battery state of charge, or other vehicle operating condition. If method 400 judges that vehicle controls have requested an engine pull-up, the answer is yes and method 400 proceeds to 436. Otherwise, the answer is no and method 400 returns to 402, or alternatively exits.

At 436, method 400 performs an engine pull-up. The engine pull-up may be performed via rotating the engine via an electric machine. In addition, spark and fuel may be delivered to the engine while the engine is being rotated via the electric machine. Method 400 returns to 424 after the engine is started.

In this way, operating modes of an engine may be switched to provide battery charging during conditions when a transmission is commanded to a neutral state. In addition, the engine may be stopped even though a vehicle's power split transmission is commanded to neutral so that fuel consumption may be reduced. The battery charging may be performed in a way that may reduce a possibility of unintended vehicle movement.

Thus, the method of FIGS. 4 and 5 provides for a method for operating an engine, comprising: via a controller, adjusting engine torque as a function of a delivered or an actual braking torque in response to a transmission shifter being engaged in a neutral position. In a first example, the method includes where adjusting engine torque includes adjusting a torque actuator. In a second example that may include the first example, the method includes where adjusting engine torque includes adjusting engine torque as a function of applied or actual brake torque that is sufficient to hold a vehicle stationary. In a third example that may include one or more of the first and second examples, the method includes where adjusting engine torque includes adjusting engine torque as a function of road grade. In a fourth example that may include one or more of the first through third examples, the method includes where adjusting engine torque includes adjusting engine torque as a function of a battery charging limit. In a fifth example that may include one or more of the first through fourth examples, the method includes where adjusting engine torque includes adjusting engine torque as a function of a desired charging limit. In a sixth example that may include one or more of the first through fifth examples, the method further comprises automatically shutting down the engine while the engine is operating in a mode where engine torque is adjusted as a function of the requested braking torque.

The method of FIGS. 4 and 5 also provides for a method for operating an engine, comprising: operating the engine in a torque control mode in response to vehicle speed being less than a threshold speed, an applied brake torque being greater than a threshold torque, and a shift selector being engaged in a neutral position, where operating the engine in the torque control mode includes adjusting engine torque as a function of brake torque. In a first example, the method further comprises adjusting engine torque as a function of road grade. In a second example that may include the first example, the method further comprises adjusting engine torque as a function of a battery charging limit. In a third example that may include one or more of the first and second examples, the method further comprises shutting down the engine in response to a vehicle controls request. In a fifth example that may include one or more of the first through fourth examples, the method includes where the engine is coupled to a power split transmission.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an engine, comprising:
via a controller, adjusting engine torque as a function of an applied or an actual braking torque and a battery charging limit in response to a transmission shifter being engaged in a neutral position.

2. The method of claim 1, where adjusting engine torque includes adjusting a torque actuator.

3. The method of claim 1, where adjusting engine torque also includes adjusting engine torque as a function of road grade.

4. The method of claim 1, where adjusting engine torque includes adjusting engine torque as a function of a desired charging limit.

5. The method of claim 1, further comprising automatically shutting down the engine while the engine is operating in a mode where engine torque is adjusted as a function of the applied or the actual braking torque.

6. A system, comprising:
an internal combustion engine;
a power split transmission coupled to the internal combustion engine, the power split transmission including two electric machines;
a shift selector; and
a controller including executable instructions stored in non-transitory memory that cause the controller to operate the internal combustion engine in a torque control mode in response to a vehicle speed being below a threshold speed, an applied brake torque being greater than a threshold torque, and the shift selector being engaged in a neutral position.

7. The system of claim 6, further comprising additional instructions that cause the controller to operate the internal combustion engine in a speed control mode in response to the vehicle speed being below the threshold speed, the applied brake torque being less than the threshold torque, and the shift selector being engaged in the neutral position.

8. The system of claim 7, where the two electric machines include a first electric machine configured to deliver power to the power split transmission and a second electric machine, and further comprising:
additional instructions to operate the second electric machine to generate zero wheel torque while operating the internal combustion engine in the speed control mode.

9. The system of claim 6, further comprising additional instructions to adjust torque of the internal combustion engine while operating in the torque control mode as a function of brake torque.

10. The system of claim 9, further comprising additional instructions to adjust torque of the internal combustion engine while operating in the torque control mode as a function of road grade.

11. The system of claim 10, further comprising additional instructions to adjust torque of the internal combustion engine while operating in the torque control mode as a function of a battery charging limit.

12. The system of claim 11, further comprising additional instructions to shut down the internal combustion engine while the internal combustion engine is operated in the torque control mode.

13. The system of claim 11, further comprising additional instructions to apply spark retard as a function of a catalyst temperature during the torque control mode.

14. A method for operating an engine, comprising:
operating the engine in a torque control mode in response to vehicle speed being less than a threshold speed, an applied brake torque being greater than a threshold torque, and a shift selector being engaged in a neutral position, where operating the engine in the torque control mode includes adjusting engine torque as a function of brake torque.

15. The method of claim 14, further comprising adjusting engine torque as a function of road grade.

16. The method of claim 14, further comprising adjusting engine torque as a function of a battery charging limit.

17. The method of claim 14, further comprising shutting down the engine in response to a vehicle controls request.

18. The method of claim 14, where the engine is coupled to a power split transmission.

* * * * *